Patented Feb. 12, 1924.

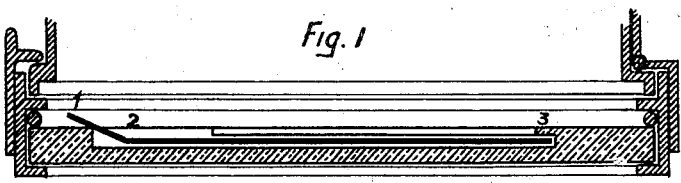
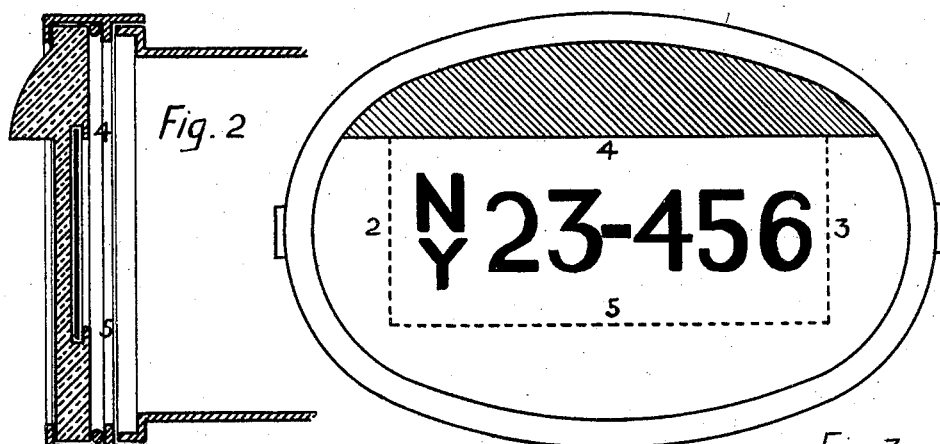
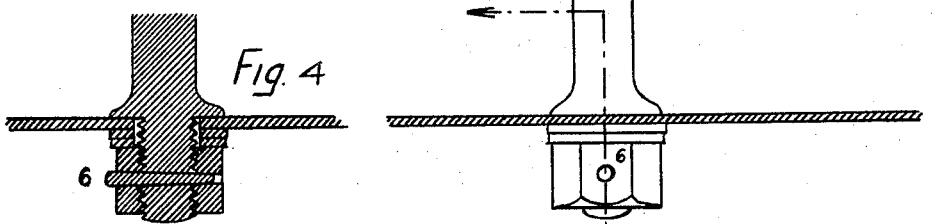
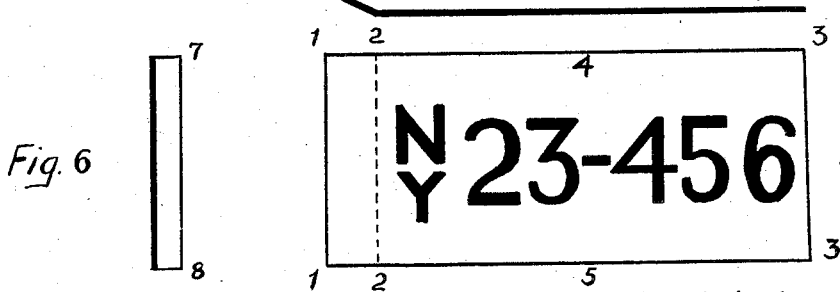

1,483,836

UNITED STATES PATENT OFFICE.

JOSEPH ODILON REMILLARD, OF MONTREAL, QUEBEC, CANADA, ASSIGNOR, BY DIRECT AND MESNE ASSIGNMENTS, OF TWELVE PER CENT TO ALPHONSUS GORMAN AND FIFTY PER CENT TO JOHN ALEXANDER HUGH CAMERON, TRUSTEE, BOTH OF MONTREAL, QUEBEC, CANADA.

ANTITHEFT AUTOMOBILE LICENSE AND OWNER'S TITLE.

Application filed May 6, 1922, Serial No. 559,092. Renewed June 16, 1923.

*To all whom it may concern:*

Be it known that I, JOSEPH ODILON REMILLARD, a British subject, and a citizen of the Dominion of Canada, residing at the city of Montreal, in the Province of Quebec, Dominion of Canada, have invented a new and useful Antitheft Automobile License and Owner's Title, of which the following is a specification.

My invention relates to an anti-theft duplicate automobile license and owner's title which bears the same number as the regular automobile license and is inserted in the face of an automobile lamp and is removed to prevent the automobile from being operated, either during the day or during the night, by any person or persons who has or have no legal right to operate same.

I attain these objects by a mechanism illustrated in the accompanying drawing in which—

Figure 1 is a horizontal section of an automobile lamp showing the anti-theft automobile license and owner's title 1 2 3 in position;

Figure 2, a vertical section of an automobile lamp also showing the anti-theft automobile license and owner's title 4 5 in position;

Figure 3, a front view of an automobile lamp fastened to the mudguard of an automobile, showing anti-theft automobile license and owner's title 2 3 4 5, under green shade surrounded by frosted glass, and lock-pin 6 in nut below mud-guard;

Figure 4, a vertical section of part of Figure 3, showing manner of fastening automobile lamp to mud-guard with a tapered lock-pin 6, inserted so as to point outwards from body of automobile;

Figure 5, a front view of anti-theft automobile license and owner's title;

Figure 6, a vertical view of anti-theft automobile license and owner's title 7 8; and Figure 7, a horizontal view of anti-theft automobile license and owner's title 1 2 3.

Similar numerals refer to similar parts throughout the several views.

The anti-theft automobile license and owner's title, Figure 5, consists of a thin rectangular-shaped substance with a bend at one end as illustrated at 2 in Figure 7. This thin rectangular-shaped substance, bearing the same number as the official automobile license, is inserted in a ground or moulded groove at the edge of a rectangular depression on the inside of the glass of an automobile lamp as illustrated 4 5 in Figure 2.

It is removed by the person having the legal right to operate the automobile when the automobile is not in use and is only inserted in its place immediately before the automobile is put into use, its absence from the automobile clearly indicating to the traffic authorities and to the public that the case is one for immediate detention and enquiry.

If the person operating an automobile has a legal right to operate it, he can easily show, under ordinary circumstances, that he has a legal right to do so; otherwise, the automobile should be detained until his right to operate such automobile has been properly established.

Thus this anti-theft automobile license and owner's title will make it practically impossible for a thief to steal an automobile unless he first succeeds in stealing the anti-theft automobile license and owner's title from the operator's pocket.

The lamp containing the anti-theft automobile license and owner's title is fastened to the mud-guard with a tapered lock-pin 6, with the larger end facing outside, making it difficult to steal the lamp containing the anti-theft automobile license and owner's title.

While I have described my invention as taking a peculiar form, it will be understood that the various parts of my invention may be changed without departing from the spirit thereof, and hence I do not limit myself to the precise construction set forth but consider that I am at liberty to make such changes as fairly come within the scope of the appended claims.

I claim:

1. The combination, in the glass of an automobile lamp, of a rectangular-shaped substance, containing the official license number of an automobile, for use as a duplicate license and as an anti-theft automobile license and owner's title, with a bend at one end of said rectangular-shaped substance, for use in removing same from the glass of an automobile lamp, and a rectangular depression on the inside of said glass with a groove along both sides and one end for keeping said rectangular-shaped substance in place and an aperture at the other end for inserting and removing said rectangular-shaped substance, all substantially as set forth.

2. The combination, in the glass of an automobile lamp, of a flexible rectangular-shaped substance, containing the official license number of an automobile, for use as a duplicate license and as an anti-theft automobile license and owner's title, with a bend at one end of said flexible rectangular-shaped substance, for use in removing same from the glass of an automobile lamp, and a rectangular depression on the inside of said glass with a groove along both sides and one end for keeping said flexible rectangular-shaped substance in place, and an aperture at the other end for inserting and removing said flexible rectangular-shaped substance, all substantially as set forth.

3. The combination, in the glass of any transportation vehicle lamp, of a rectangular-shaped opaque substance, containing the official license number of such transportation vehicle, for use as a duplicate license and as an anti-theft transportation vehicle license and owner's title, with a bend at one end of said rectangular-shaped opaque substance, for use in removing same from the glass of a transportation vehicle lamp, and a rectangular depression on the inside of said glass with a groove along both sides and one end for keeping said rectangular-shaped opaque substance in place, and an aperture at the other end for inserting and removing said rectangular-shaped opaque substance, all substantially as set forth.

4. The combination, in the glass of any transportation vehicle lamp, of a flexible rectangular-shaped opaque substance, containing the official license number of such transportation vehicle, for use as a duplicate license and as an anti-theft transportation vehicle license and owner's title, with a bend at one end of said flexible rectangular-shaped opaque substance, for use in removing same from the glass of a transportation vehicle lamp, and a rectangular depression on the inside of said glass with a groove along both sides and one end for keeping said flexible rectangular-shaped opaque substance in place, and an aperture at the other end for inserting and removing said flexible rectangular-shaped opaque substance, all substantially as set forth.

JOSEPH ODILON REMILLARD.